United States Patent [19]
Nakamats

[11] Patent Number: 5,399,251
[45] Date of Patent: Mar. 21, 1995

[54] SYSTEM FOR GENERATING HYDROGEN AND OXYGEN

[76] Inventor: Yoshiro Nakamats, 1-10-309, Minami-Aoyama 5-chome, Minato-ku, Tokyo, Japan

[21] Appl. No.: 150,578

[22] Filed: Nov. 10, 1993

Related U.S. Application Data

[63] Continuation of Ser. No. 620,187, Nov. 29, 1990, abandoned.

[30] Foreign Application Priority Data

Apr. 26, 1990 [JP] Japan ................... 2-108672

[51] Int. Cl.$^6$ ............................... C25B 1/02
[52] U.S. Cl. ........................... 204/262; 123/3; 204/129; 204/266; 204/274; 204/278
[58] Field of Search ............... 204/129, 262, 266, 275, 204/278; 123/3

[56] References Cited

U.S. PATENT DOCUMENTS

| | | | |
|---|---|---|---|
| 4,124,463 | 11/1978 | Blue | 204/129 |
| 4,312,736 | 1/1982 | Menth et al. | 205/255 |
| 4,352,722 | 10/1982 | Ohkawa | 204/129 |
| 4,369,737 | 1/1983 | Sanders et al. | 123/3 |
| 4,442,801 | 4/1984 | Glynn et al. | 123/3 |
| 4,720,331 | 1/1988 | Billings | 204/129 |
| 5,037,518 | 8/1991 | Young et al. | 204/230 |

OTHER PUBLICATIONS

F. A. Lowenheim, *Electroplating*, McGraw-Hill Book Co., New York, 1978, pp. 109–111.

*Primary Examiner*—John Niebling
*Assistant Examiner*—William T. Leader
*Attorney, Agent, or Firm*—Jordan and Hamburg

[57] ABSTRACT

A system for generating hydrogen and oxygen includes a tank and a solid polyelectrolyte film which separates the tank into first and second portions. Electrodes are provided on opposed first and second sides of the polyelectrolyte film. A power supply is connected to the electrodes. The system includes means for introducing water into the bottom of the first portion of the tank and a vibrating means for vibrating the polyelectrolyte film, electrodes and water. A power regulator which regulates power from the power supply and includes an electronic element that generates heat is provided. The electronic element is mounted in the tank for heating the water. The hydrogen generated by the system may be supplied together with gasoline to the engine of an automobile while the generated oxygen may be released to the inside of the car.

2 Claims, 18 Drawing Sheets

SYSTEM FOR GENERATING HYDROGEN AND OXYGEN

This application is a continuation of application Ser. No. 07/602,187, filed Nov. 29, 1990, now abandoned.

FIELD OF THE INVENTION

This invention relates to an energy system for electrolyzing water with high efficiency to generate hydrogen and oxygen. Such hydrogen and oxygen may be employed, for example, as a fuel for powering automobiles, ships, airplanes and rockets, and for generating electricity. The system enables reduction of air pollution.

BACKGROUND OF THE INVENTION

In Japan the number of automobile has sharply increased due to the high growth of the economy, and air pollution caused by automobile traffic has become a large problem. Environmental standards have been established concerning nitrogen dioxide, which is an indicator of air pollution, but the yearly average value of nitrogen dioxide has recently turned to rising trend as shown by FIG. 1 according to an investigation by The Environment Agency of the Japanese Government. In order to reduce this problem, electric automobiles have been developed to power low pollution cars. This solution is expensive, provides only short running distances per charge and results in low powered vehicles.

Using methanol to power cars results in half of the running distance than is obtained with conventional gasoline for each filling of the tank, and a supply organization for distributing methanol is not complete.

Compressed natural gas automobiles also have short running distances per charge and their total weight increases due to the necessity of mounting a gas cylinder on the vehicle.

Fuel mounting technology and safety assurance for driving hydrogen powered automobiles have not been solved yet. Gas turbine automobiles have low reliability, efficiency and reaction to acceleration and deceleration, and exhaust too much nitrogen dioxide. Sterling engines are heavy and bulky and require long starting times, and their reliability has not been confirmed. Hydrogen automobiles using electricity and diesel engines are heavy, and more study is required for controlling such engines. With gasoline Cars using LPG jointly, the cost of improvement is very expensive, and also LPG distribution is not fully available.

Many ways have been studied for decreasing the exhaust composition of air pollution from automobile engine. In accordance with one of these techniques, the combustion of diluted fuel has been tried. Such techniques generally complicate the construction of engine, in comparison with conventional engines.

SUMMARY OF THE INVENTION

This invention is directed to the provision of a method for reducing or eliminating air pollution by effectively extracting hydrogen from water without changing the construction of the engine. Hydrogen has such properties as wider combustion range, higher combustion speed, less ignition energy and more easily making uniform mixed gas than gasoline, and this invention contemplates. the combustion of diluted mixed gas and decreases the exhaust of nitrogen dioxide.

BRIEF DESCRIPTION OF THE DRAWING

In order that the invention may be more clearly understood, it will now be disclosed in greater detail with reference to the accompanying drawing, wherein.

DETAILED DISCLOSURE OF THE INVENTION

Figure 1:
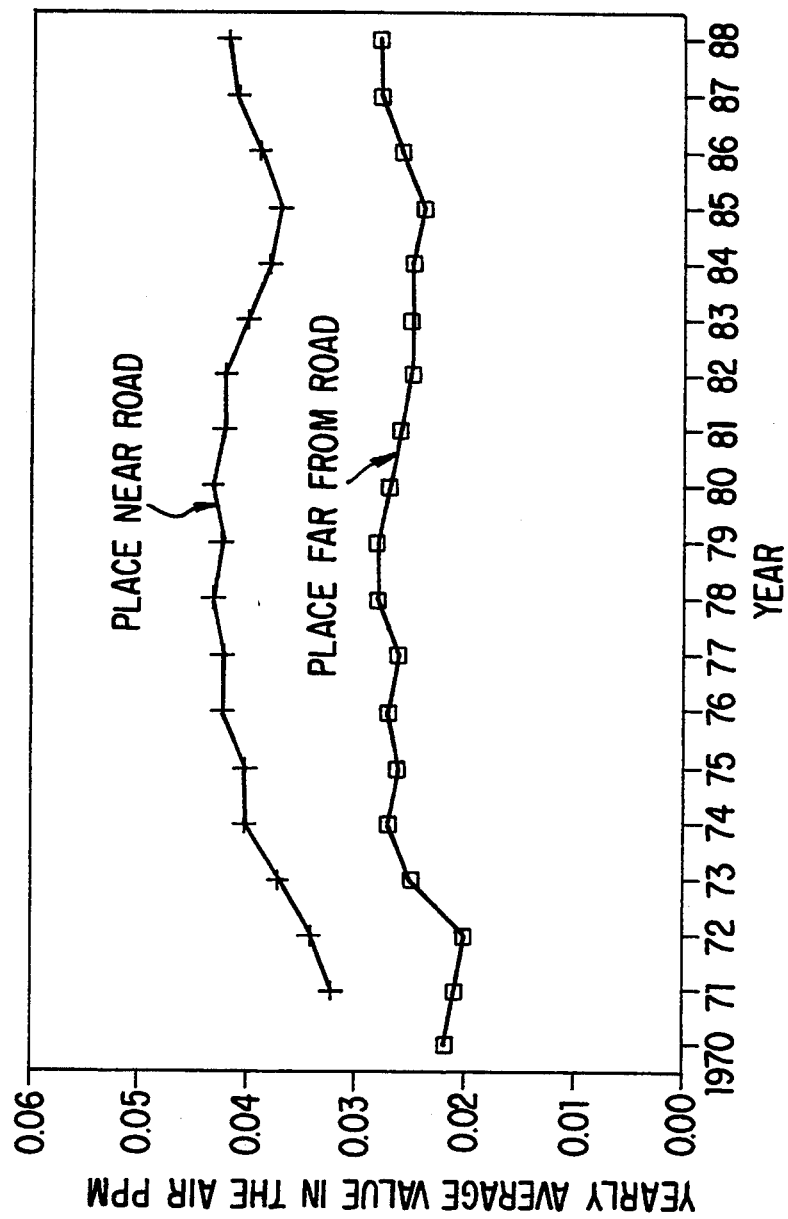
FIG. 1 is a graph showing the yearly change of nitrogen dioxide in the air.
Figure 2:
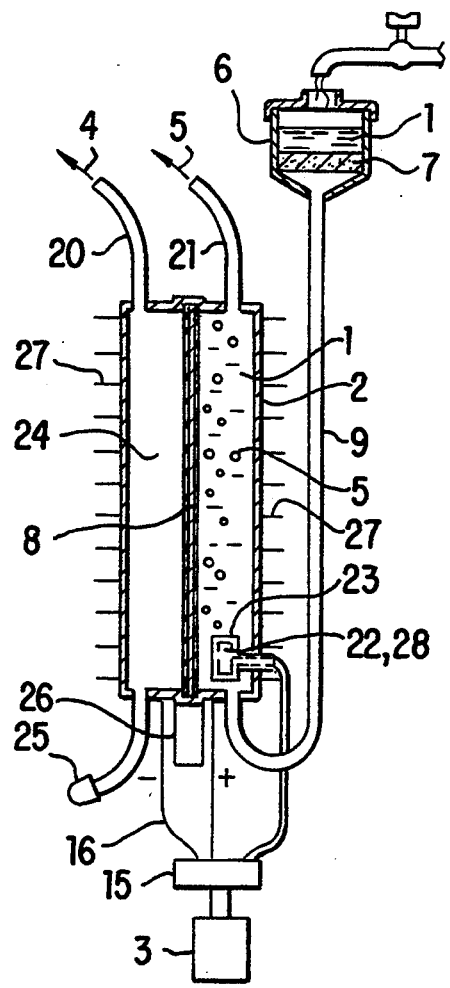
FIG. 2 shows a longitudinal section of example 1.

FIG. 2 shows the example of the invention wherein water 1 is supplied to an electrolytic bath 2 to be electrolyzed by electric current from a battery 3, the equipment being mounted on a car (not illustrated). Hydrogen 4 generated in the equipment is supplied together with gasoline to the engine, and generated oxygen 5 is released to the inside of the car.

An ion exchange resin layer 7 of replaceable construction is mounted in the outlet of a water tank 6, so that distilled water for electrolysis is not required, and ordinary tap water from a water faucet, etc. can be used. Water tank 6 is placed with the water level therein always higher than electrolytic bath 2, so that pressure is always applied to an electrolytic film 8 within the electrolytic bath 2. Water from the tank 6 enters from the bottom of electrolytic bath via a pipe 9. This accelerates the chemical reaction in the bath and decreases electrical consumption by heating, as described below cold water immediately after it is sent from below electrolytic bath instead of from above, in order to raise the temperature within the electrolytic battery as much as possible and by sending heated water within the electrolytic bath to keep a high temperature within the bath as much as possible, without enabling the water to flow back to water tank.

The water electrolysis method of the invention employs solid polyelectrolyte water electrolysis by polymer electrolysis, and does not need electrolytic liquid. This is one feature of the invention.

As shown in FIG. 2, 3, 4, 5, 6 and 7 and also as described below, the electrolytic film in the electrolytic bath 2 is a solid polyelectrolytic film 8 having a positive electrode 10 on one side and a negative electrode 11 on the other side. The solid polyelectrolytic film 8 extends vertically and is sandwiched with apertured metal plates 12, metal nets 13 and another apertured metal plates 14 symmetrically arranged on both sides of film 8. The solid polyelectrolytic film 8 is mounted to extend vertically in order to enable it to vibrate as the car or other vehicle is moved in order to easily set hydrogen foam free, to thereby accelerate the chemical reaction, to enhance the efficiency of heating from the outside of the electrolytic bath and the efficiency of heating up interior heat generating substance by making the electrolytic film thinner, not to prevent hydrogen and oxygen from rising, and also to simplify the drain on the side of positive electrode. Electricity is applied to electrodes 10, 11 of said film 8 from power supply 15 connected to battery 3 via electric cables 16.

Figure 7:
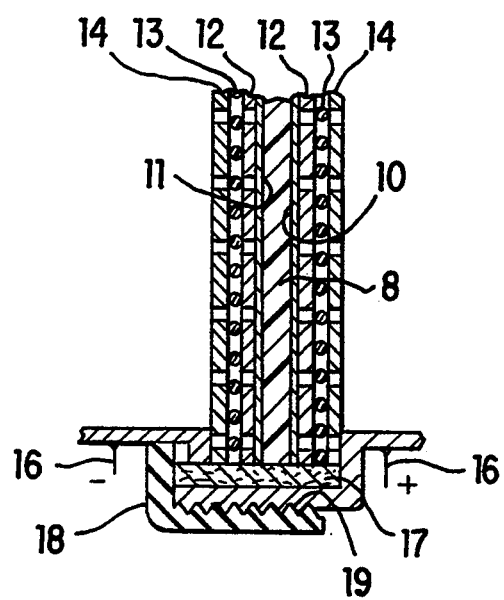
FIG. 7 shows a side view of FIG. 2.

The solid polyelectrolytic film 8 illustrated in FIG. 7 set forth above is a cation exchange film having the following chemical formula:

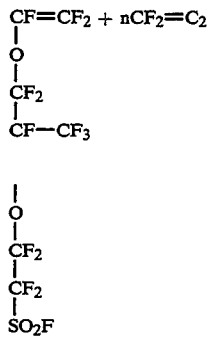

Figure 3:
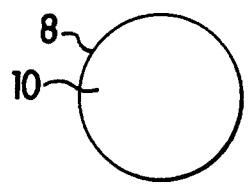
FIG. 3 shows a side view of FIG. 2.

As shown in the plan view of FIG. 3 and cross section of FIG. 7, thin film electrodes 10, 11 of porous anti-corrosive catalytic metals such as platinum of platinum group, rhodium, palladium, ruthenium, iridium, etc. are applied to both sides of the electrolytic film 8.

Figure 4:
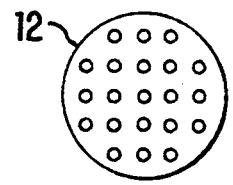
FIG. 4 shows a side view of part of FIG. 2.
Figure 5:
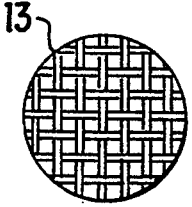
FIG. 5 shows a side view of part of FIG. 2.
Figure 6:
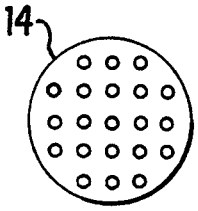
FIG. 6 shows an enlarged view of part of FIG. 2.

As further shown in FIG. 7, the apertured metal plates 12 of FIG. 4 contact the electrodes 10, 11 and the layers of the metal mesh 13 of FIG. 5 are attached to the outer sides of the apertured metal plates 12. The apertured metal plates 14 of FIG. 6 are attached to the outer sides of the layers of metal mesh 13. The layers including the apertured metal plates 14, metal mesh layers 13, apertured metal plates 12, positive and negative electrodes 10. 11 and the electrolytic film 8, are fastened together with inserted packings 17 by the meshed threads 19 of an electrically insulated holder 18. The electrolytic film 8 is replaceable, if necessary, for instance every 3 years. When electricity is applied between the positive electrode 10 and the negative electrode 11 via the apertured metal plate 12, water 1 permeating to the electrolytic film 8 is electrolyzed, generating oxygen from the positive electrode 10 and hydrogen from the negative electrode 11. Hydrogen is supplied from the outlet pipe 20 at the upper portion of electrolytic bath 2 to an engine, etc. and oxygen is discharged to the cabin of the vehicle, via outlet pipe 21 located at the upper portion of electrodes.

Anti-corrosive materials such as plastic or titanium or material coated With fluoric resin are used for the electrolytic bath. In examples of the invention employing a 20 mm diameter electrolytic film, hydrogen was generated at 12.59 cc/minute with a voltage of 12 V and current of 2.5 A; hydrogen was generated at 9.98 cc/minute with a voltage of 12 V and current of 2.0 A; hydrogen was generated at 7.53 cc/minute at a voltage of 12 V and current of 1.5 A, hydrogen was generated at 5.00 cc/minute at a voltage of 12 V and current of 1.0 A; and hydrogen was generated at 2.42 cc/minute at a voltage of 12 V and current of 0.5 A.

Figure 9:
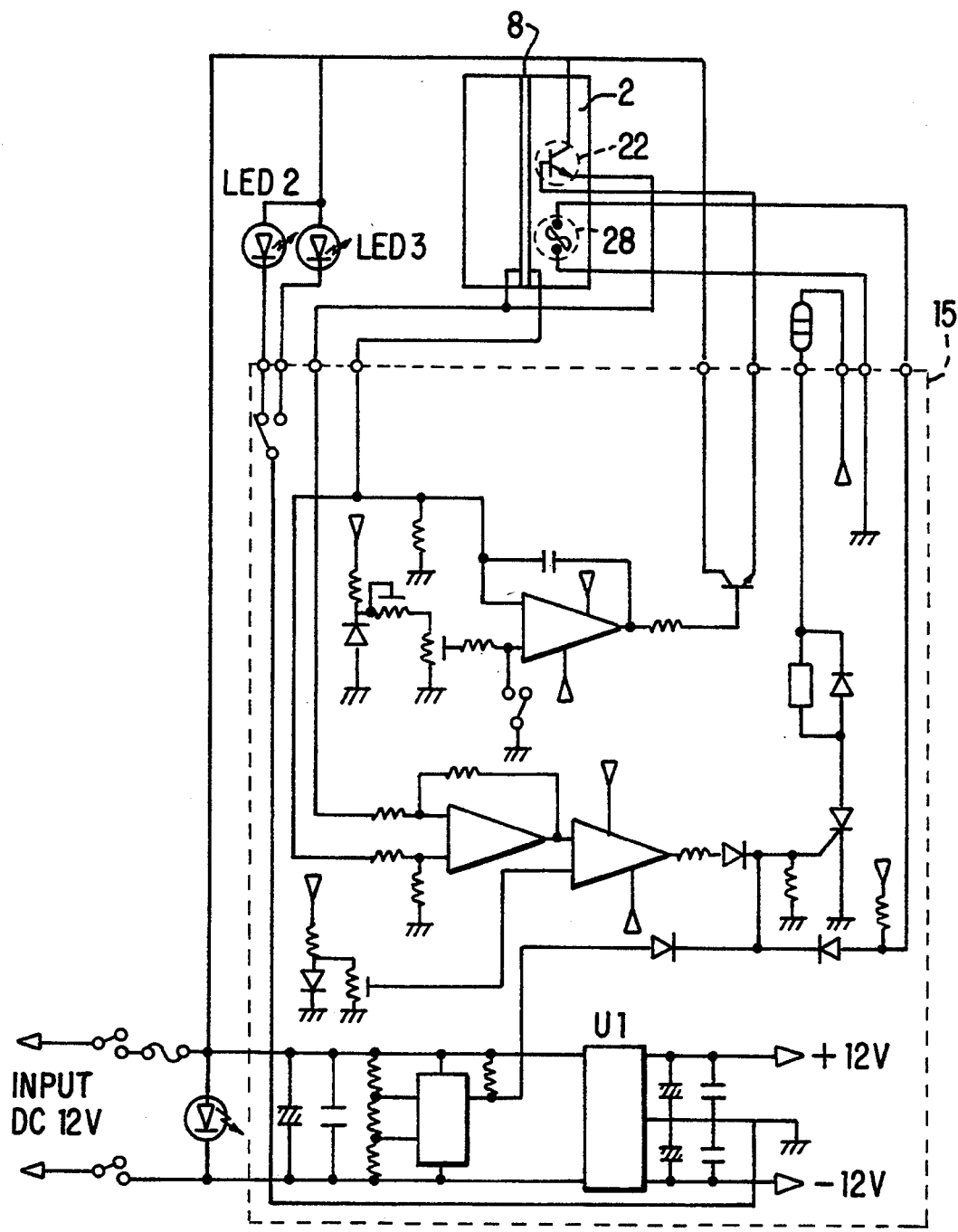
FIG. 9 shows a circuit diagram of example 1.

In order to heat water within the electrolytic bath 2 shown in FIG. 2, a heat generating element 22 such as a rectifier, transistor, etc. in the circuit of the power supply 15 shown by FIG. 9, is coated with Teflon resin or sealed in titanium box 23, and mounted within the electrolytic bath 2. This arrangement is designed to heat water at the location of electrolysis and to simultaneously cool the heat generating parts of the power supply circuit. Especially when the electrolytic bath is made of plastics without using heat absorbing fins, as set forth later, this method is especially advantageous, since plastics cannot absorb external and in addition heat produced from heat generating interior substances is insulated by plastics to enhance the interior heating efficiency.

The space 24 for receiving hydrogen generated on the side of negative electrode and water permeating from electrolytic film can be discharged from the space 24 via drain valve 25.

Part 26 is a support to hold the system of the invention under the hood, etc. of an automotive vehicle, this support enabling substantial vibration of the electrolytic bath 2 with vibration of automobile.

Figure 8:
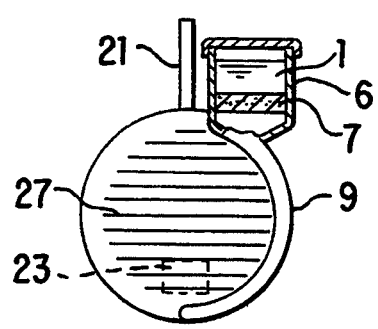
FIG. 8 shows a side view of example 2.

FIG. 8 illustrates a side view of the arrangement of FIG. 2, showing that the electrolytic film 8 may be circular. With this arrangement, the device of the invention is compact since the water pipe 9 is arranged along the round side of the bath, and the absorption of heat from the external fins is not disturbed.

Solid polyelectrolyte water electrolysis by electrolytic film 8 and catalytic metallic electrode 10, 11 used for the system of the invention enables the attaining of high energy efficiency without using an electrolytic liquid,,and the energy system is compact and easy to handle. As shown in FIG. 2, heat absorbing fins 27 are mounted externally on the electrolytic bath 2 to absorb heat from the engine or under the hood. The fins aid in the heating of the water within the electrolytic bath 2 by a heat generating element, so that the electrolytic voltage can be reduced by 5 to 10%. In addition this enables the release of oxygen foam from the electrolytic film 8 to be accelerated by transmitting engine and car movement vibration to the electrolytic film 8, thereby enhancing the energy generating efficiency, so that extremely high energy efficiencies as 95% can be obtained.

Hydrogen coming from the pipe 20 of the system of the invention can be supplied to the suction duct of a hydrogen engine, and is also usable for conventional gasoline automobile. In this event, if the system is mounted under the hood to send hydrogen to the intake duct of the engine, under the power of the car battery, to mix hydrogen with evaporated gasoline, fuel expense can be not only saved but is also possible to reduce C0, C02, and N0 within exhaust gas. In addition, sleepiness of the driver can be prevented, thereby enhancing attention of the driver to careful driving. By discharging oxygen coming from the pipe 21 of the system of the invention to the drivers seat in order to provide oxygen to the brain of driver.

The circuit of FIG. 9, is an example of the circuit of the power supply 15 for supplying constant current from the battery 3 to the electrolytic bath 2. The battery of the automobile is usable for supplying the input to this circuit, for example a battery having a capacity of 12 VDC at 5 A can be used, and the range of input voltages for the circuit is 10–15 V.

The output of the circuit of FIG. 9 is set with range of 0 VDC, 4 A. Lamp LED 2 is lit to shut off the output current when the output voltage exceeds DC 2.8 V by increasing of the resistance resulting from long usage of the solid polyelectrolytic film, or when the input voltage has fallen to lower than DC 10 V due to consumption of the battery and the temperature of radiator exceeds 80 degrees C. Lamp LED 3 is lit when output current is supplied.

Part U-1 in the power supply circuit is a DC/DC converter to provide an output voltage of $-12$ V necessary to drive the op-amp.

Part 28 of the circuit is a thermal fuse which senses the temperature in the bath to shut off the output current when the temperature of element 22 rises to more than 80 degrees C.

Element 22 in the circuit is a transistor having large heat generation. The invention serves the double purpose of enhancing electrolytic efficiency to lower the voltage by raising the water temperature within electrolytic bath 2 by using the heating property of element 22, as shown by FIG. 2, and also of cooling the transistor or other element 22 at the same time.

Figure 19:
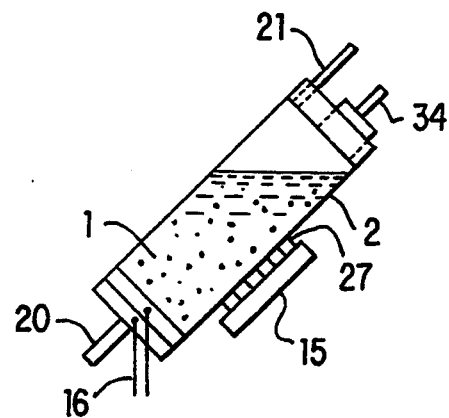
FIG. 19 shows a side view of example 11.

As shown in FIG. 19, it is also possible to heat the water by attaching radiation fins 27 to the transistor and contacting the radiation fins with the metallic electrolytic bath 2 made of such metals as titanium, etc. It is also possible to heat the water by contacting the radiation fins with the outside of electrolytic bath 2 made of such metals as titanium, etc.

Figure 10:
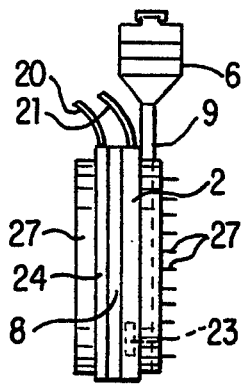
FIG. 10 shows a longitudinal section of example 3.
Figure 11:
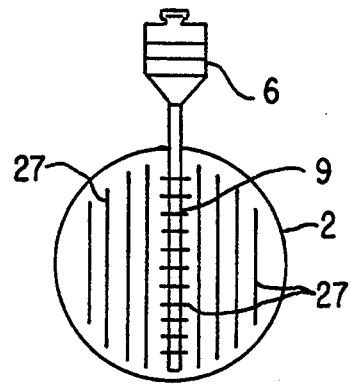
FIG. 11 shows a side view of FIG. 10.

FIG. 10 and FIG. 11 show an example of the invention wherein heat absorbing fins 27 are mounted to extend in the direction of the diameter of electrolytic bath 2, and water pipe 9 is inserted between the heat absorbing fins 27 so as to place the heat absorbing fins 27 on the water pipe 9 itself in order to preheat the water before it enters the electrolytic bath.

Figure 12:
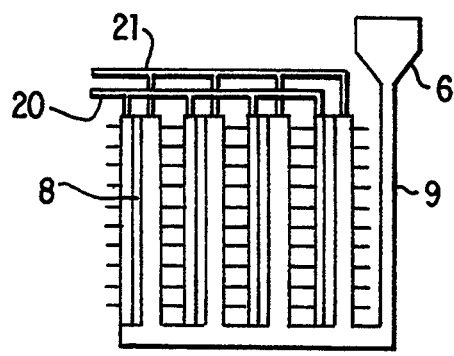
FIG. 12 shows a side cross section of example 4.

FIG. 12 shows an example of the invention wherein a plurality of electrolytic films 8 are aligned in parallel to increase the generation of hydrogen. This reason for the use of a plurality of electrolytic films is explained in the following paragraphs.

Gasoline is represented by the formula $C_8H_{16}$ and if the hydrogen mixing rate is 5%, the volume of hydrogen to 1 mol (112 g) of gasoline is $112\times 0.05/(1-0.05)=5.89$ g.

Since the heat generating volume at low mixtures of hydrogen and gasoline is 10,500 kcal/kg and 28,800 kcl/kg respectively, when a 5% hydrogen mixing rate is converted to heat generating volume, hydrogen becomes $5.89\times 28.8/(5.89\times 28.8+112\times 10.5)=12.6\%$.

Considering a 30% heat efficiency of the engine and approximately 10 horsepower under light load (40 to 50 km/h of constant speed on city roads), heat input at 10 horsepowers (7.35 kw) of net output is $7.35/0.3=24.5$ kw$=24.5\times 860$ kcal/h$=21,070$ kcal/h.

The supply calorie of hydrogen out of the 21,070 kcal/h is $0.126\times 21,070=2,655$ kcal/h and that of gasoline is $21,070-2,655=18,415$ kcl/h. When obtaining heat generating volume from 0.0899 kg/m3 (gas) of hydrogen's density and 0.74 kg/l (liquid) of gasoline's density, hydrogen is $28,800\times 0.0899=2,589$ kcal/m3 ($H_2$ gas) and gasoline $10,500\times 0.74=7,770$ kcal/m3 (gasoline). Consequently the supply volume of hydrogen and gasoline is $2,655/2,589/60=17.1$ l/min and $1,841.5/7,770/60=39.5$ cc/min respectively.

Figure 22:
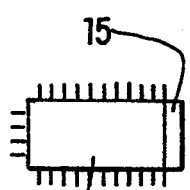
FIG. 22 shows a plane view of example 14.

Assuming that one sheet of electrolytic film with a 8 cm diameter generates 50 cc/min of hydrogen, 342 sheets of the film aligned in parallel are required to supply 17.1 l/min of hydrogen to a conventional automobile engine. However, as shown in FIG. 22, in the system of the invention using a hydrogen tank 31, the number of electrolytic films as set forth above is not required, since controller 32 controls the necessary volume of hydrogen according to the condition of the engine and because, as long as the controller 32 works, hydrogen is stored in the tank to be released only when necessary.

Figure 13:
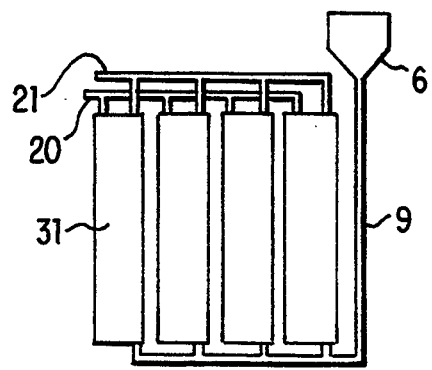
FIG. 13 shows a side cross section of example 5.

FIG. 13 shows an example of the invention wherein a plurality of electrolytic baths are connected to a unit 31.

Figure 14:
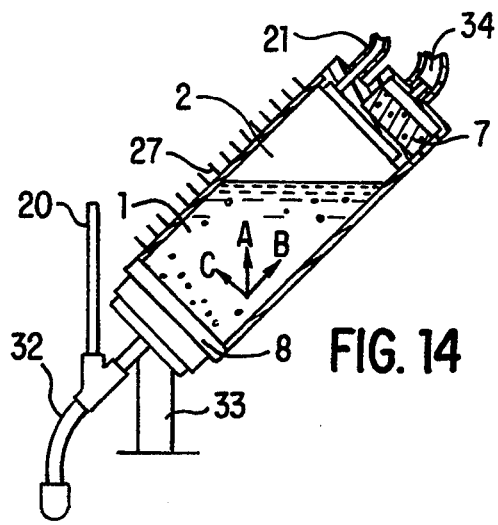
FIG. 14 shows a side cross section of example 6.

FIG. 14 shows an example of the invention wherein the electrolytic bath 2 is cylindrical with the electrolytic film 8 attached to its bottom. Vibration of car moves water within the electrolytic bath 2 in a vertical direction A, and power in the A direction is divided into the B direction axial of the electrolytic bath 2 and in the C direction at right angles to the axis of the electrolytic bath 2 and also in parallel with the surface of the electrolytic film 8, in order to accelerate discharging foam of hydrogen coming from electrolytic film 8 to enhance electrolytic efficiency. Heat absorbing fins 27, drain pipe 32, fixture 33, water inlet 34, ion exchange resin layer 7, hydrogen outlet 20 and oxygen outlet 21 are mounted in the electrolytic bath 2.

Figure 15:
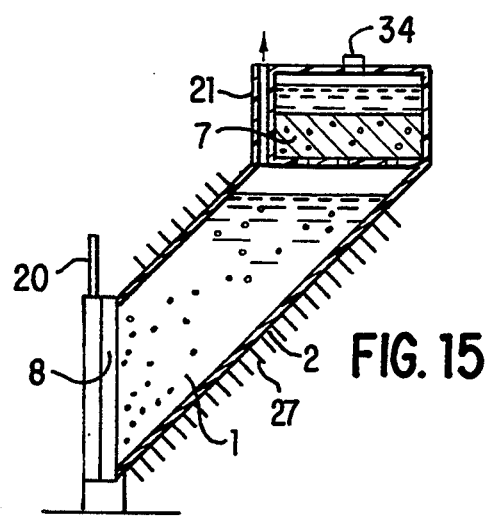
FIG. 15 shows a side cross section of example 7.

FIG. 15 shows an example of the invention wherein the electrolytic bath 2 is inclined and the bottom of electrolytic bath extends vertically. In this arrangement the water inlet is in an upper horizontal portion of electrolytic bath. The ion exchange resin layer and the electrolytic film are represented by the reference numerals 7 and 8 respectively. The electrolytic bath is made of non-corrosive metals such as titanium, etc. and heated semi-conductors in the power supply circuit contact the outside of electrolytic bath so that the heat of engine, etc. is transmitted through fins 27 to heat the electrolytic bath.

Figure 16:
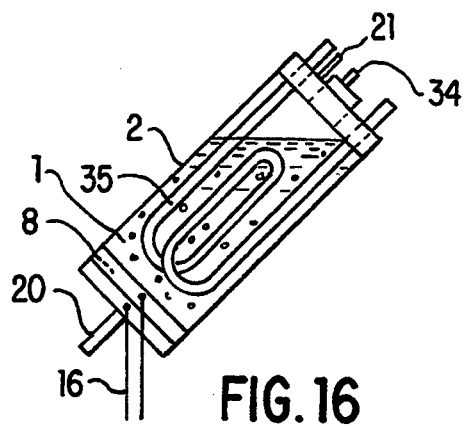
FIG. 16 shows a side cross section of example 8.

FIG. 16 is an example of the invention wherein the electrolytic bath, etc. are heated. Using the example of FIG. 14, heating pipe 35 is installed in the cylindrical electrolytic bath 2 to heat the water 1 by sending heat of the engine and exhaust into heating pipe 35 in order to enhance the electrolytic efficiency.

Figure 17:
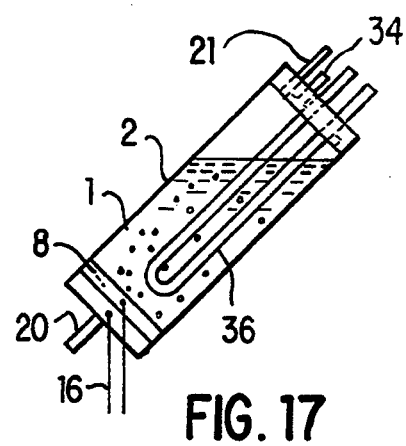
FIG. 17 shows a side cross section of example 9.

FIG. 17 shows an example of the invention wherein an electric heating wire 36 coated with Teflon resin is placed within the electrolytic bath 2 to heat water 1 by current from the automobile battery.

Figure 18:
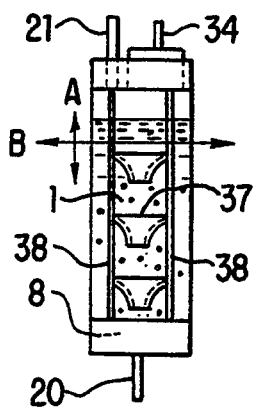
FIG. 18 shows a side cross section of example 1.

FIG. 18 is an example of the invention using a vertically extending tube shown in FIG. 14, wherein members 37 in the shape of trumpet horns are supported by rods 38 inserted in the water tank 1. Motion A of the water in a vertical direction due to up and down movement of car is converted to movement in the horizontal direction B to improve discharging and dispersing foam of the hydrogen gas.

FIG. 19 is an example of the invention wherein radiating fins 27 of the power supply 15 are attached along the outside wall of the electrolytic bath 2 to heat the water within the electrolytic bath 2 by heat generated from the power supply and also to cool the heat generating semi-conductors.

Figure 20:
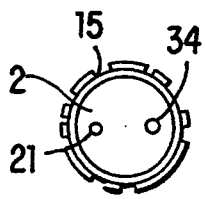
FIG. 20 shows a plane view of example 12.

FIG. 20 is an example of the invention wherein the power supply 15 is fabricated on a flexible printed circuit board which is mounted around the electrolytic bath 2 to heat water within the bath and cool the power supply circuit.

Figure 21:
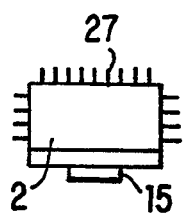
FIG. 21 shows a plane view of example 13.

FIG. 21 is an example of the invention wherein the power supply 15 is fixed on the wide bottom of the electrolytic bath 2 in the form of a cube and heat absorbing fins 27 are attached to other surfaces, so that the electrolytic efficiency can be enhanced by heat generated by the power supply and heat absorbed by fins 27 from the engine.

FIG. 22 is an example of the invention wherein the power supply 15 is mounted on a narrow longitudinal face of the electrolytic bath in the form of a rectangular parallel piped, as shown in the previous example.

Figure 23:
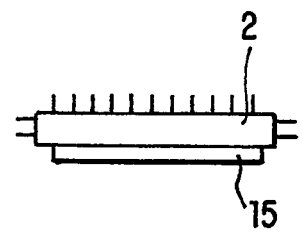
FIG. 23 shows a plane view of example 15.

FIG. 23 shows an example of the invention wherein the electrolytic bath 2 is very thin, so that the temperature of interior water is easy to raise by external heating, and the power supply 15 is set on the wide bottom of the electrolytic bath 2.

Figure 24:
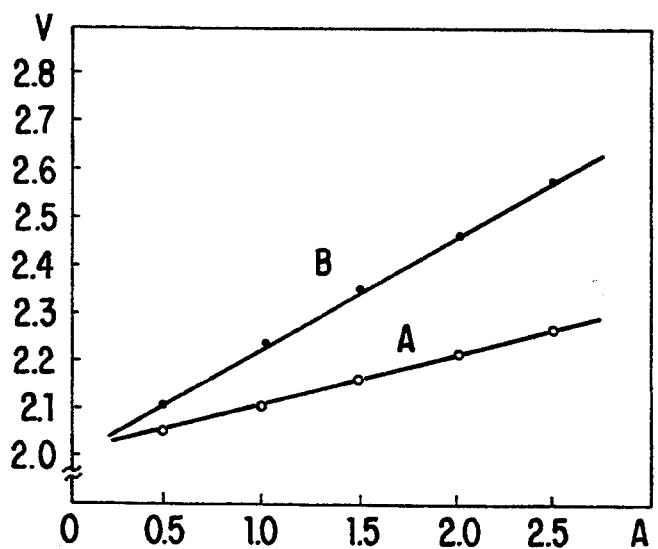
FIG. 24 is a graph showing voltage and current.

FIG. 24 shows the test results of the inventor, assuming that the abscissa and ordinate represent the necessary current and voltage and current, respectively, for electrolysis, and the curve B shows the relationship between the voltage and current when neither heat nor vibration is provided. Curve A shows the relationship in accordance with the invention upon the application of loading pressure on the electrolytic film 8 by heating and vibrating water 1 within electrolytic bath 2. This test shows that the voltage necessary for electrolysis is reduced by at least 15% and the energy efficiency is consequently enhanced.

Figure 25:
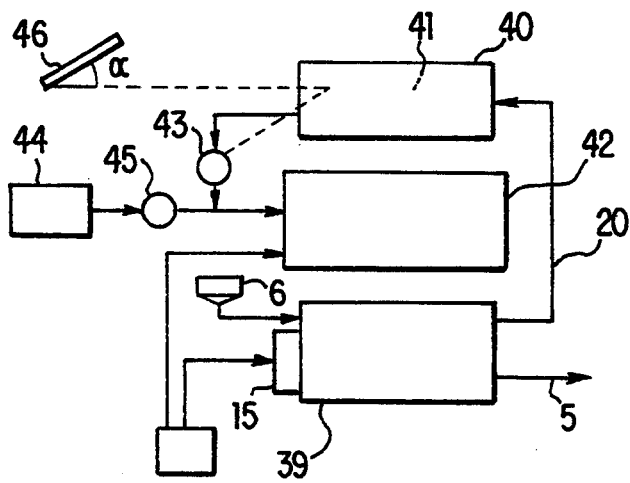
FIG. 25 shows a process diagram of example 16.

FIG. 25 shows an example of the invention comprised of 3 main elements of the hydrogen generating apparatus, hydrogen storing apparatus and controller which have been explained with reference to FIG. 2.

The hydrogen outlet pipe 20 from the electrolytic hydrogen generating apparatus 39 driven by the battery 3 and the power supply 15 of FIG. 2 are connected to the hydrogen tank 40, where a hydrogen storage alloy 41, such as iron plus titanium or iron plus titanium plus niobium, invented by me, is filled to efficiently absorb hydrogen. As I have explained in another of my patent applications, an alloy of iron and titanium and Niobium has a hydrogen storage capacity of 6.7 times as much as a conventional hydrogen cylinder. A controller 43 for controlling the hydrogen volume is set between this hydrogen tank 40 and the engine 42. Gasoline 44 is supplied to the engine 42 via and evaporator 45. FIG. 25 also shows the system where hydrogen is supplied from the controller 43.

The hydrogen controller 42 is designed to increase and decrease the supplied volume of hydrogen as a function of the rpm of the engine or the angle (alpha) of the accelerator pedal 46.

The hydrogen generating apparatus 39 receives heat produced by the engine or exhaust from the engine or from a supply of electricity to heat the generating parts 22 of the power source and electrolytic film 8, and produces hydrogen to be stored in the hydrogen storage alloy filled hydrogen tank 40. The hydrogen storage alloy in the hydrogen tank is cooled by water 1 in order to send hydrogen to hydrogen tank by pressure for storage.

The hydrogen storage alloy filed storage tank 40 is placed close to the engine to discharge hydrogen from the metal by heat coming from engine 42. This hydrogen tank 40 is connected to the hydrogen controller 42 which is designed to shut down hydrogen when the load to engine becomes large. In other words, the controller 43 is closed and the supply of hydrogen to the engine stops or is reduced, during which period hydrogen from the hydrogen generating apparatus is stored in the hydrogen tank. The controller, when necessary, opens to send hydrogen to the engine. Therefore, in accordance with the invention, even a small hydrogen generating capacity is enough to drive the engine, so that the system may be small. A hydrogen cylinder can be used instead of the hydrogen tank 31, or can be used along with the hydrogen tank 31.

The controller 43 changes the volume of hydrogen in proportion to the size of the load, the density of mixed gas and the size of mixing ratio.

Figure 26:
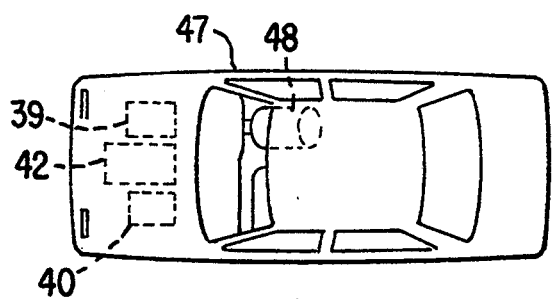
FIG. 26 is a plane view of example 17.

FIG. 26 is a plane figure showing an automobile 47 incorporating the system of the invention, and also illustrating the driver 48.

Figure 27:
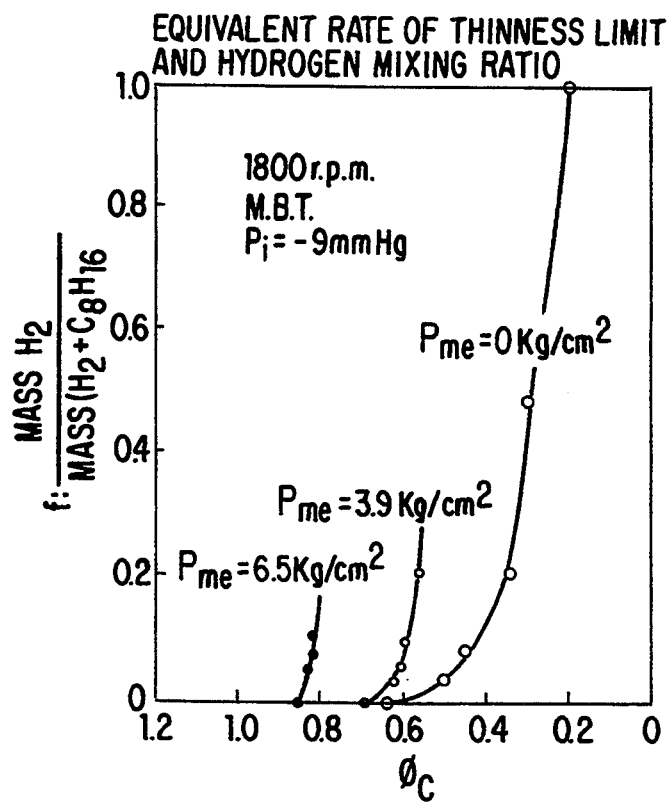
FIG. 27 to FIG. 44 show graphs of the examples of the invention.

In order to describe the hydrogen controller 43, the test data of the example of the invention, FIG. 27 graphically shows the relationship between the equivalent ratio of limit of hydrogen thinness $\phi$ and the hydrogen mixing rate f.

Hydrogen generated by this system was sent into an inlet pipe located at approximately 50 mm down from the throttle valve within the pipe or suction pipe located at approximately 150 mm up from carburetor. The stroke capacity of engine used for this experiment is 323 cc.

The equivalent ratio $\phi$ of hydrogen is represented by the ratio of quality and volume of oxygen necessary for complete combustion of mixed gas consisting of hydrogen and gasoline with respect to the quality and volume of oxygen within the mixed gas. The hydrogen mixing rate f is represented by comparison of quality and volume of hydrogen with quality of volume of hydrogen plus gasoline.

As clearly apparent from FIG. 27, the effect of driving capacity of thin fuel increases at lower hydrogen mixing rates and also at lower loads.

Figure 28:
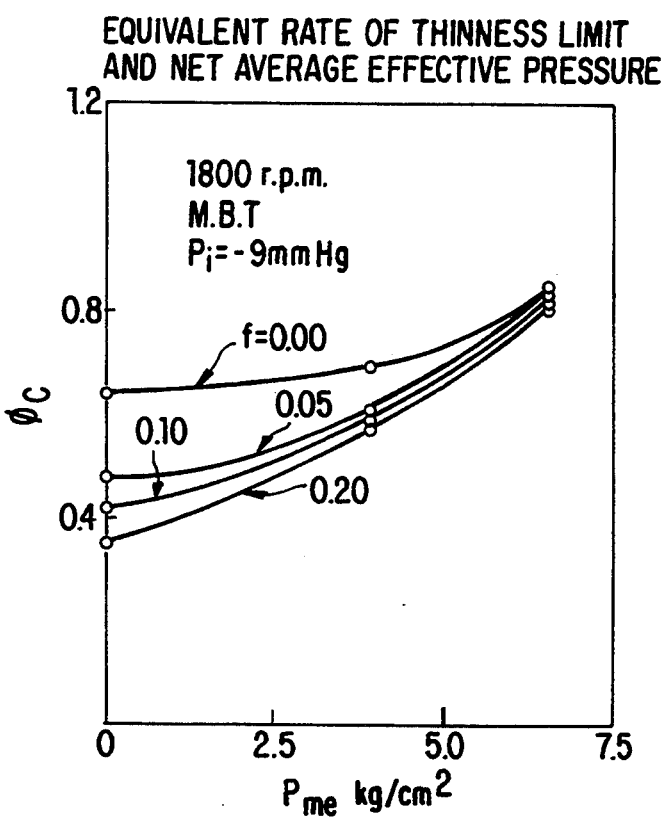

FIG. 28 shows that a thicker mixed gas is required as hydrogen in the system increases together with increases of load.

Gasoline engines can be driven only by thin mixed gas of not more than approximately 1.2 times as much as generally theoretical gas volume. Therefore the output at low driving speed is controlled by throttling the volume of both the fuel and air. However, since the driving limit of thin mixed gas is expanded when adding hydrogen by this system, it is possible to control the output by decreasing only the volume of fuel without throttling air, to decrease any damage to the pump by throttling the volume of sucked air and to enhance the heat efficiency, i.e. one of effects of the present invention.

This effect becomes more remarkable with lower output of driving with thin mixing ratio, and also the addition of hydrogen when driving with thin mixed gas makes it possible to decrease the combustibility of hydrocarbon HC, CO, etc. On the other hand, when driving with a thick mixed gas near the theoretical mixing ratio (high output driving), the effect of the addition of hydrogen is lower, and when increasing the mixing ratio of hydrogen, the output adversely lowers, leading to increase in exhaust of NOx. Consequently, the addition of hydrogen is recommended for partial load driving, and driving with gasoline only is better for high load driving.

Consequently, as explained with reference to FIG. 25, I have provided a system having a hydrogen controller 43.

The effect of mixing hydrogen into the fuel when driving with a thin gas mixture is especially effective, and the preferred hydrogen mixing rate is 5 to 10%. The smaller that the flame speed is when using a thin mixed gas of gasoline and air, the more effective flame transmission is accelerated by mixing small hydrogen with the fuel, for which the present controller is effective.

When using gasoline only, the ignition advance angle, which is referred to herein as the MBT (Minimum Advance for Best Torque) increases in proportion to the rotating speed of the engine, but the degree is reduced by mixing hydrogen with the fuel. It has been found by experiment that in the case of a high speed rotation there is a trend that the effect of mixing hydrogen is large until the hydrogen mixing rate is large.

If gasoline in a thin mixed gas at constant equivalent ratio continues to be partially replaced with hydrogen, it is possible to delay the ignition time for MBT, and the output increases when the hydrogen mixing rate is small.

When maintaining a constant rotation speed, it is possible to make the equivalent ratio substantially smaller under no-load conditions, hardly changing the ignition time for MBT together with increasing hydrogen mixing ratio. With mixed gas required by the output, the smaller its equivalent rate is, the larger the hydrogen mixing effect is.

If hydrogen is mixed with mixed gas of gasoline and air, combustion speed increases and the relationship of the hydrogen mixing rate with combustion speed shows an almost straight tendency. For instance, the regular combustion speed of thin mixed gas having a 0.7 equivalent rate at a hydrogen mixing rate of 0.2% and 10% is 20.25 cm/s and 40 cm/s respectively, having an almost straight relationship. The effect of mixing hydrogen on the combustion speed is more remarkable as the mixing rate becomes smaller, showing a logarithmic change with the mixing rate.

Hydrogen mixing accelerates the effect of increasing combustion speed, particularly by turbulence of thin mixed gas. Increase of combustion speed in turbulent flow by mixing hydrogen on the side of excessive density of hydrogen having approximately 1.3 of equivalent ratio $\phi$ shows an almost straight relationship as well as an increase in regular combustion speed, and hydrogen combustion speed on the side of thin density of hydrogen increases greatly by mixing approximately 2% hydrogen. The reason why the effect of turbulence on combustion speed increases greatly on the side of thin density by adding small amount of hydrogen is that the molecule dispersion coefficient of hydrogen is so extremely large that hydrogen disperses on the surface of irregular disordered combustion and selects oxygen to burn. On the basis of observations when using a burning vessel, it has been confirmed that the irregular surface of flame becomes very fine by mixing hydrogen. Consequently, when using this mixed gas, effective transmission of flame is accelerated more and more in case of thin mixed gas and of lower mixing ratio of hydrogen. Delaying MBT ignition timing is due to not only the effect of hydrogen having a high combustion speed, but also to the effect as set forth above.

The effect of the invention on the density of air pollution materials contained in engine exhaust results in making possible the driving of cars at fully low equivalent rate of NO density compared with gasoline, only by mixing hydrogen into thin mixed gas.

Figure 29:
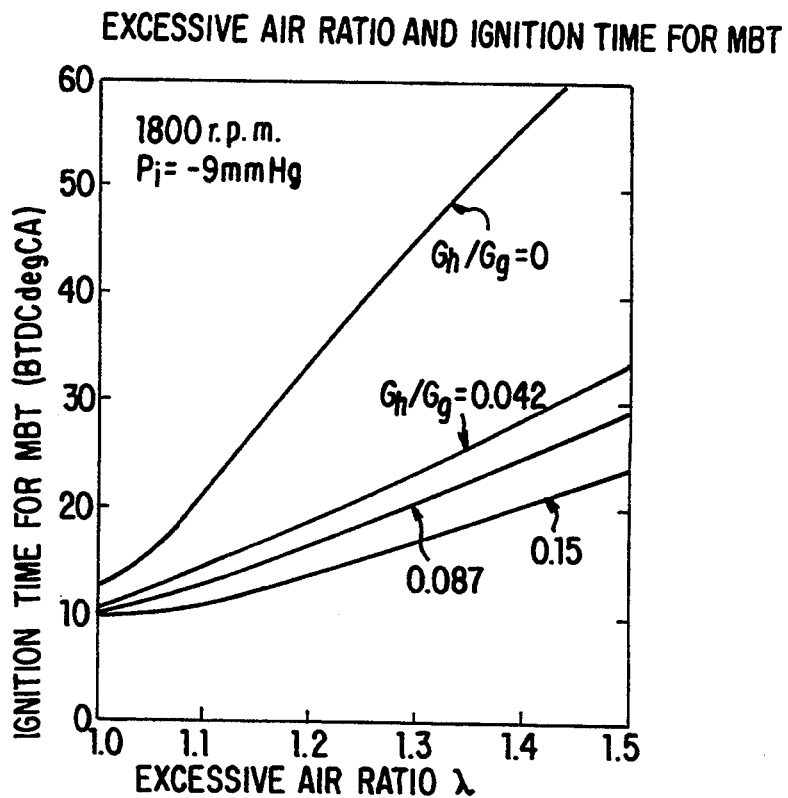

FIG. 29 shows the measurement of ignition time for MBT when driving by adding hydrogen to gasoline, and it is indicated that the ignition time for MBT is greatly delayed by adding a small amount of hydrogen.

Figure 30:
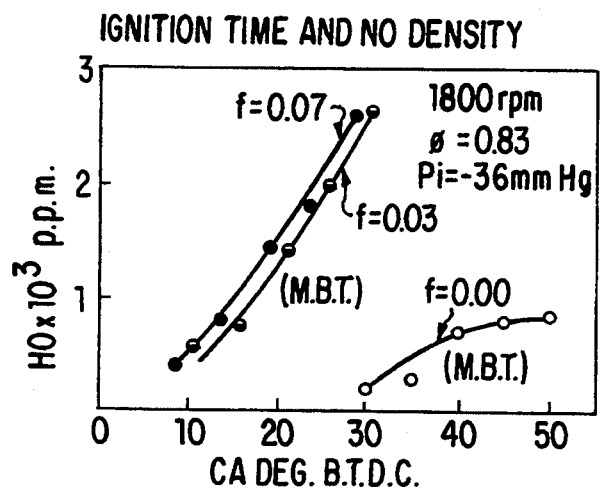

FIG. 30 shows the effect on NO density when changing the ignition timing at constant rotation speed and equivalent rate by 5 degrees and 10 degrees before and after from MBT, and the effect of the invention wherein it is possible on lowering NO density by delaying the ignition timing.

Figure 31:
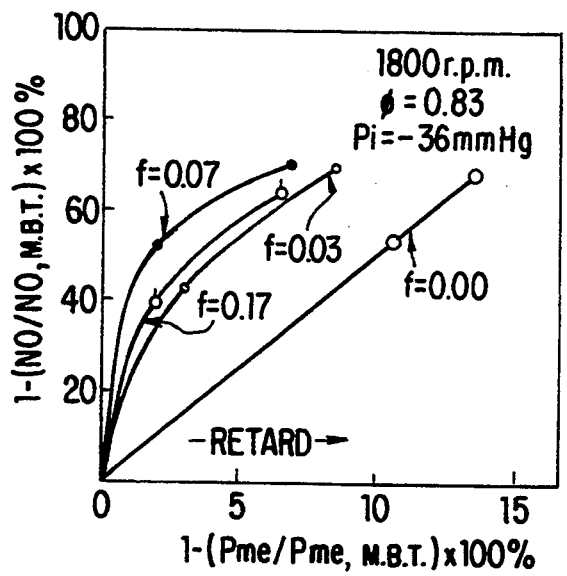

FIG. 31 shows the relationship between NO density and decreasing rate of average effective pressure according to ignition delaying angle from MBT, and it indicates the effect wherein mixing hydrogen in accordance with the invention has a large effect on lowering NO density compared with the output decrease by ignition delaying angle. Furthermore, it is the effect of the invention that, when using thinner mixed gas, mixed hydrogen is also advantageous in the NO exhausting rate (g/ps.h).

Figure 32:
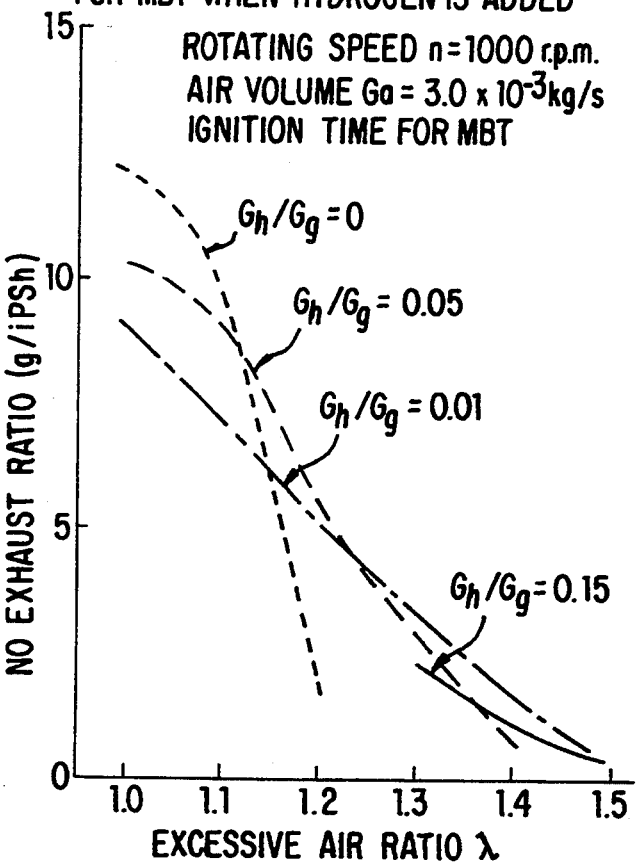

FIG. 32 shows that the NO exhaust rate is decreased by increase in the value of Gh/Gg. Compared with driving with gasoline of $\lambda=1.0$, when driving with $\lambda=1.3$ and adding hydrogen, the NO exhaust rate is decreased to approximately $\frac{1}{4}$.

Figure 33:
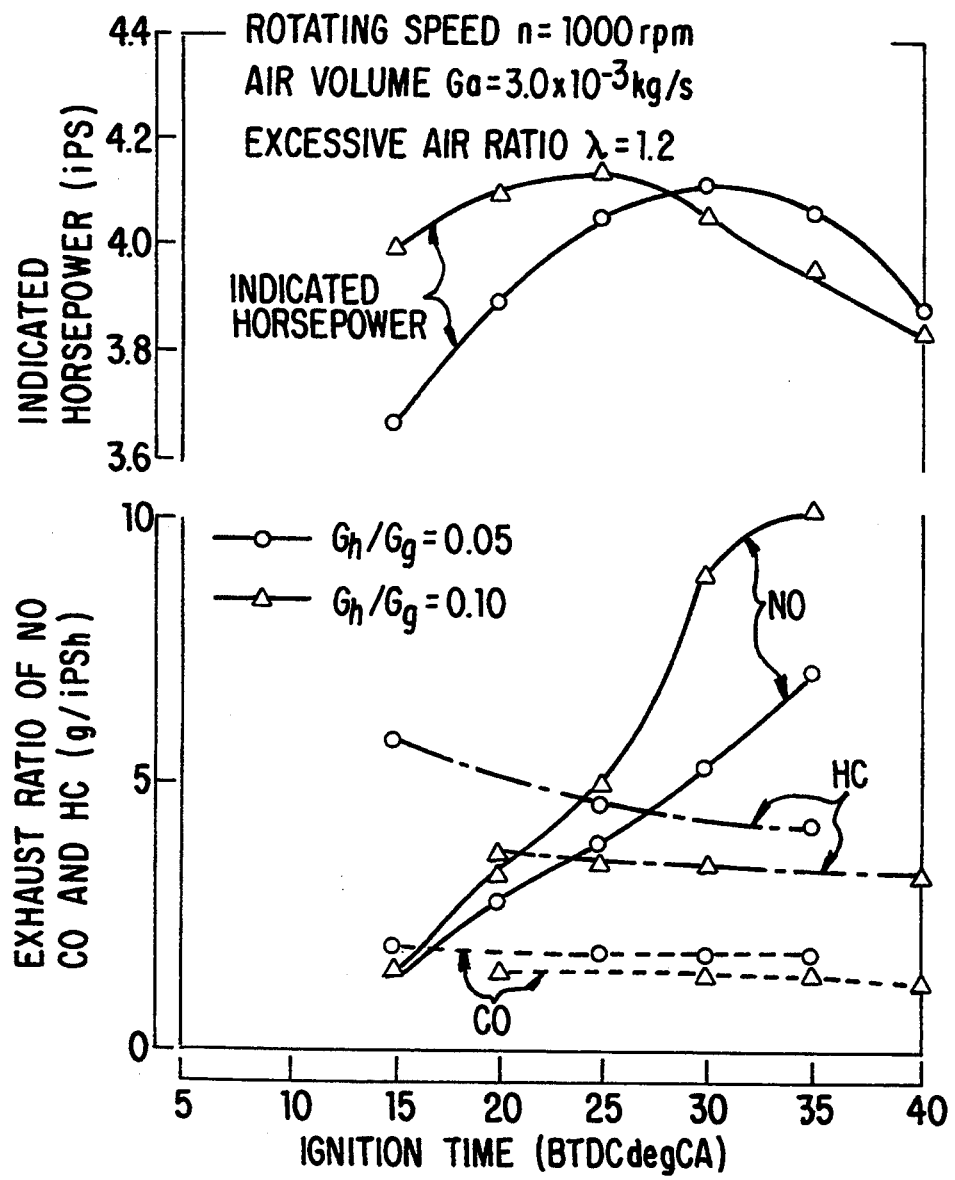

FIG. 33 shows the indicated horsepower of ignition timing, HC within the exhaust gas, CO and the effect on NO exhaust rate. The HC exhaust rate become less with increases in the added volume of hydrogen, and it slightly increases when delaying ignition time.

The reason that HC exhaust is decreased by adding hydrogen is that the flowing volume of gasoline decreases by adding the volume of hydrogen, inasmuch as the excessive air ratio $\lambda$ is kept at constant level, and that combustion efficiency around the wall of combustion chamber is accelerated since the hydrogen's lame distinguishing distance becomes small at the same time as the rise of maximum pressure. (see FIG. 42.)

The C0 exhaust rate also shows a similar tendency as the HC exhaust rate but is hardly dependable on ignition time. The NO exhaust rate sharply decreases when delaying the ignition time. The NO exhaust rate at the same ignition time increases as the value of Gh/Gg increases, since the combustion speed increases by adding hydrogen and the temperature of combustion of the gas increases.

Figure 34:
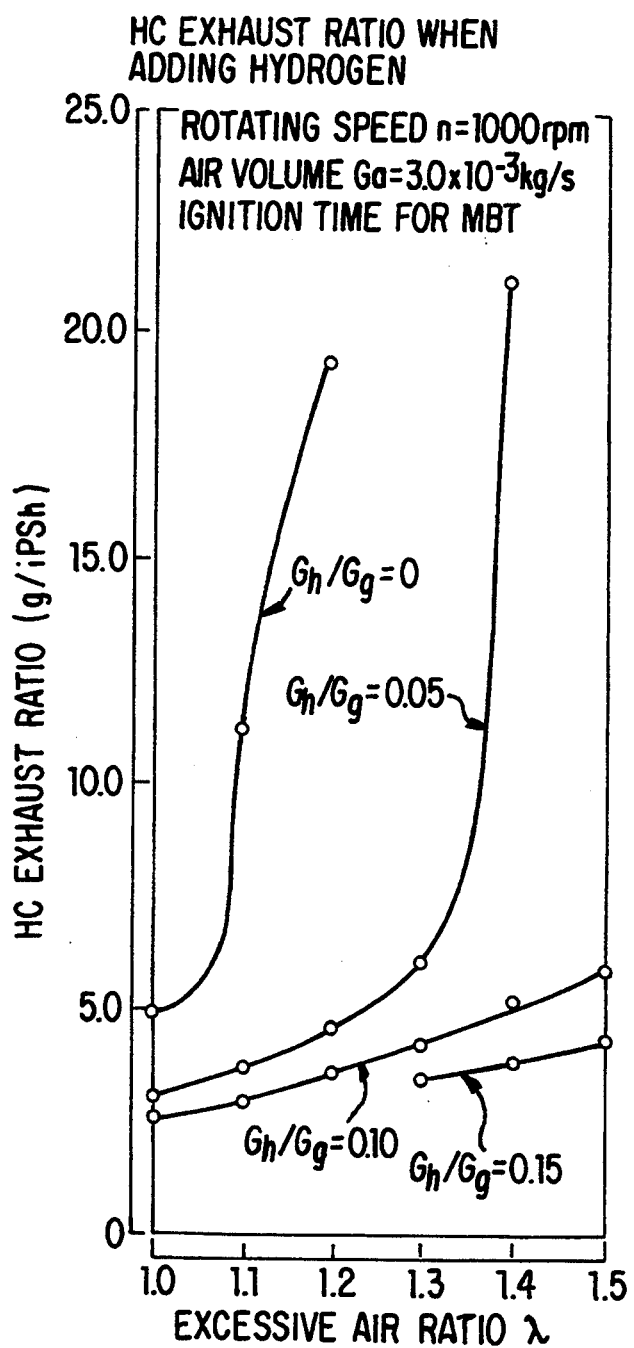

FIG. 34 shows the fluctuation of the HC exhaust ratio when changing the excessive air ratio. When approaching the condition of discontinuing combustion, the HC exhaust ratio'is seen to sharply increase. When the excessive air ratio is increased, there is trend for the HC exhaust ratio to increase, but it is possible to protect the increase in HC exhaust by increasing the Gh/Gg value.

Figure 35:
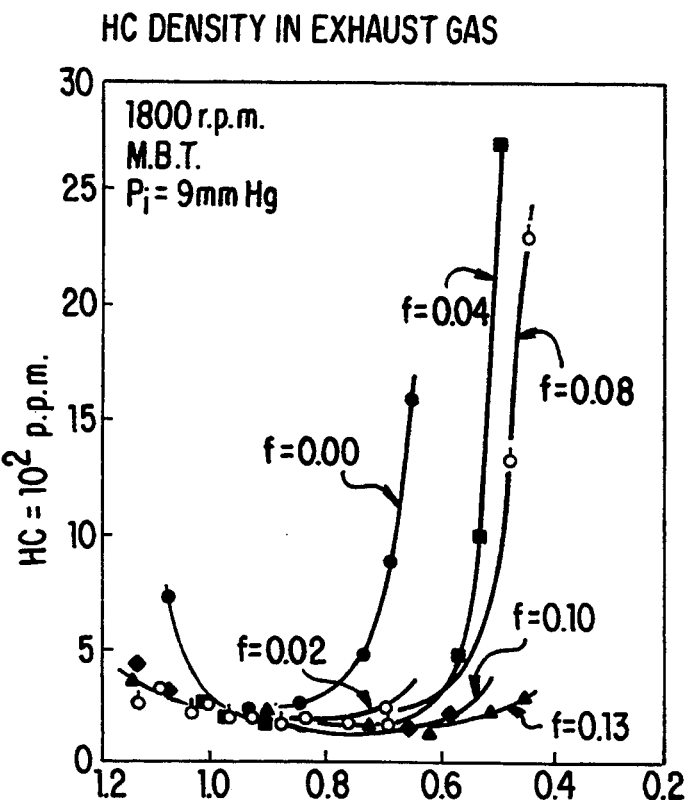

FIG. 35 shows the effect of changes in HC density within the exhaust by the equivalent ratio, using the hydrogen mixing rate of the invention as a parameter, and it indicates the effect of the invention that it is possible to control the increase in HC density until the thin side of mixed gas by mixing hydrogen according to the invention. This figure shows the effect of the invention that, when thin mixed gas having equivalent ratio $\phi$ of approximately 0.75, HC density and HC exhaust rate substantially decreased by mixing hydrogen in accordance with the invention.

Figure 36:
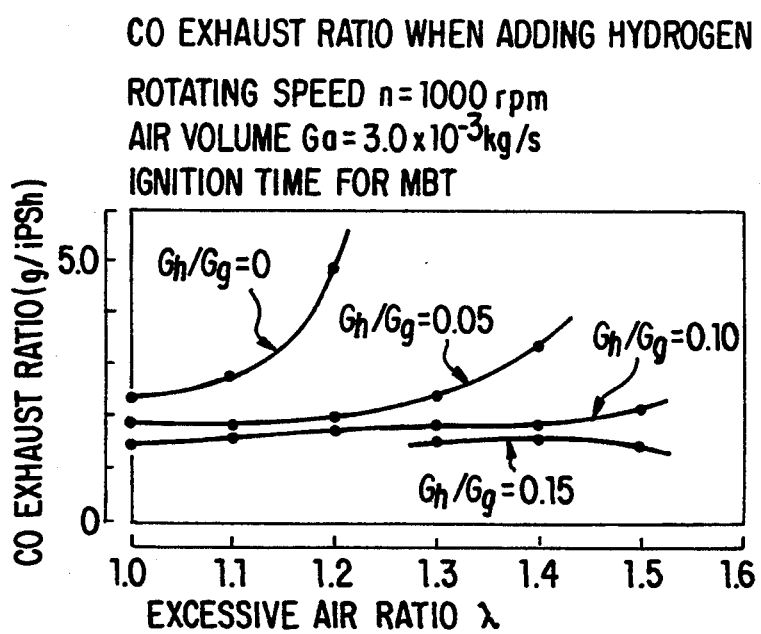

FIG. 36 shows the CO exhaust rate when adding hydrogen. The absolute value of CO exhaust rate is small.

Conventional hydrogen mixing methods cannot keep the HC density at a low level when using a thinner mixed gas as shown by FIG. 35, unless a substantially large volume of hydrogen is mixed. Therefore, conventional hydrogen mixing methods cannot control the HC density to be low, whereas the method of the invention has the effect of keeping HC at its lowest level in any case, since it automatically adjusts the volume of hydrogen according to the curve shown in FIG. 35.

Figure 37:
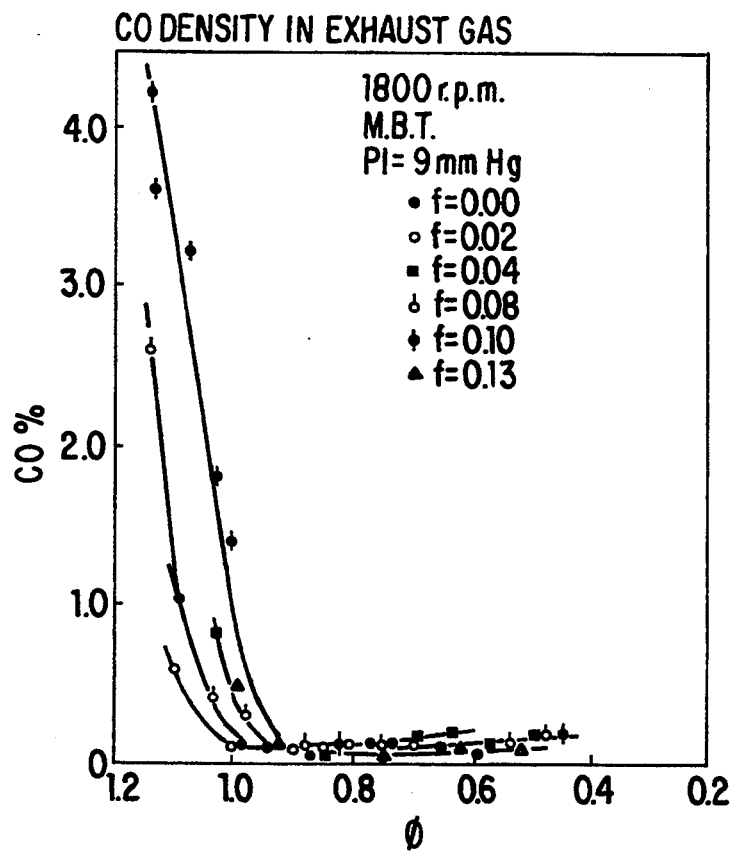

FIG. 37 shows an example of measurement of the CO density within the exhaust, and it indicates the effect of the invention wherein in case of thin mixed gas having equivalent ratio $\phi$ of less than 0.9, the CO density lowers upon mixing hydrogen according to the invention. As the mixed gas becomes thinner, it is usual for the cycle change to increase by discontinued combustion or drop of the combustion speed, but safe driving with thin mixed gas can be obtained by mixing hydrogen according to the invention, and the change in the cycle decreases.

Figure 38:
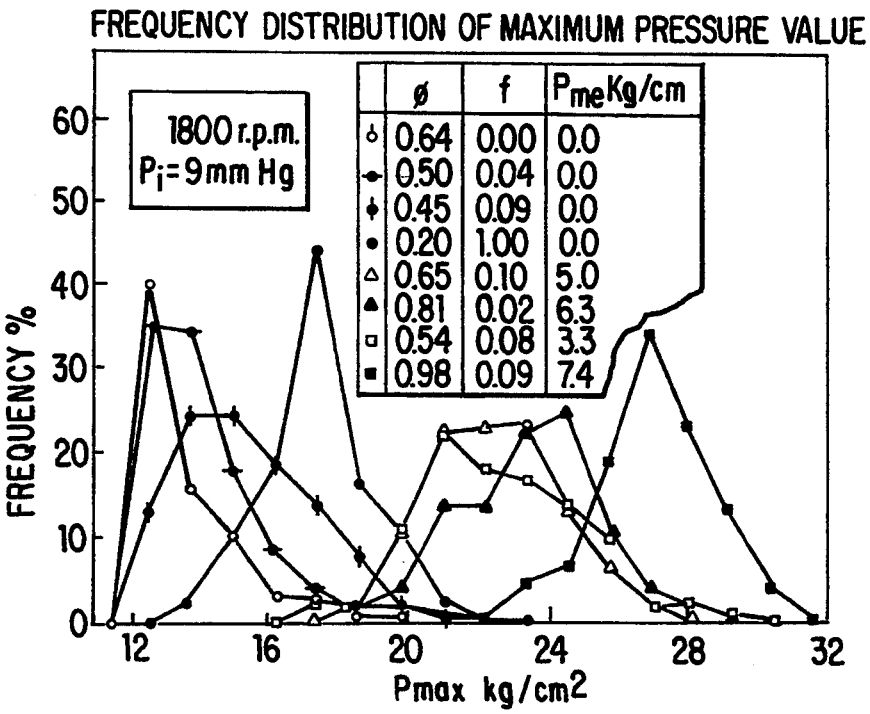

FIG. 38 shows the distribution of the frequency of maximum pressure wherein the range of fluctuation is large when using only gasoline having equivalent ratio $\phi$ close to 1, but it indicates the effect that mixing hydrogen in accordance with the invention makes the range of fluctuation small. When using only hydrogen in accordance with the system of the invention, safe driving with regular dispersion can be obtained even with mixed gas close to driving limit of thin gas.

Decreasing the ratio of maximum pressure fluctuation by mixing hydrogen does not change as much by equivalent ratio, and the invention has the large effect that fluctuation decreases to almost half at 10% mixing. The lower the gas suction pressure is, the bigger fluctuation ratio is, but the effect of mixing hydrogen in accordance with the invention is also large. When using gasoline only, the fluctuation ratio does not change as much with rotation speed. At a high speed with thin gas the invention has the effect that the fluctuation ratio is greatly reduced by mixing hydrogen therein in accordance with the invention.

As a measure to stabilize driving with thin mixed gas, there is a method using simultaneous ignition at two places. The method of the invention has the same effect when using two plugs as when using a single ignition plug.

The excessive air ratio ($\lambda$) when adding hydrogen to gasoline by the invention is:

$$\lambda = \frac{G_a/G_g}{\phi_g + \phi_h(G_h/G_g)}$$

wherein the flowing volume of air is $G_a$, the flowing volume of hydrogen in accordance with the invention is $G_h$, the flowing volume of gasoline is $G_g$ and theoretically the combustion rate of gasoline and hydrogen added by the invention is $\phi_g$ and $\phi_h$.

The calorie Q (kcal/s) per unit of time of fuel supplied to the engine is:

$$Q = g_h G_h + g_g G_G$$

provided the heat generating amount of hydrogen added by the invention and gasoline per unit of volume are $g_h$ and $g_g$, respectively.

Figure 39:
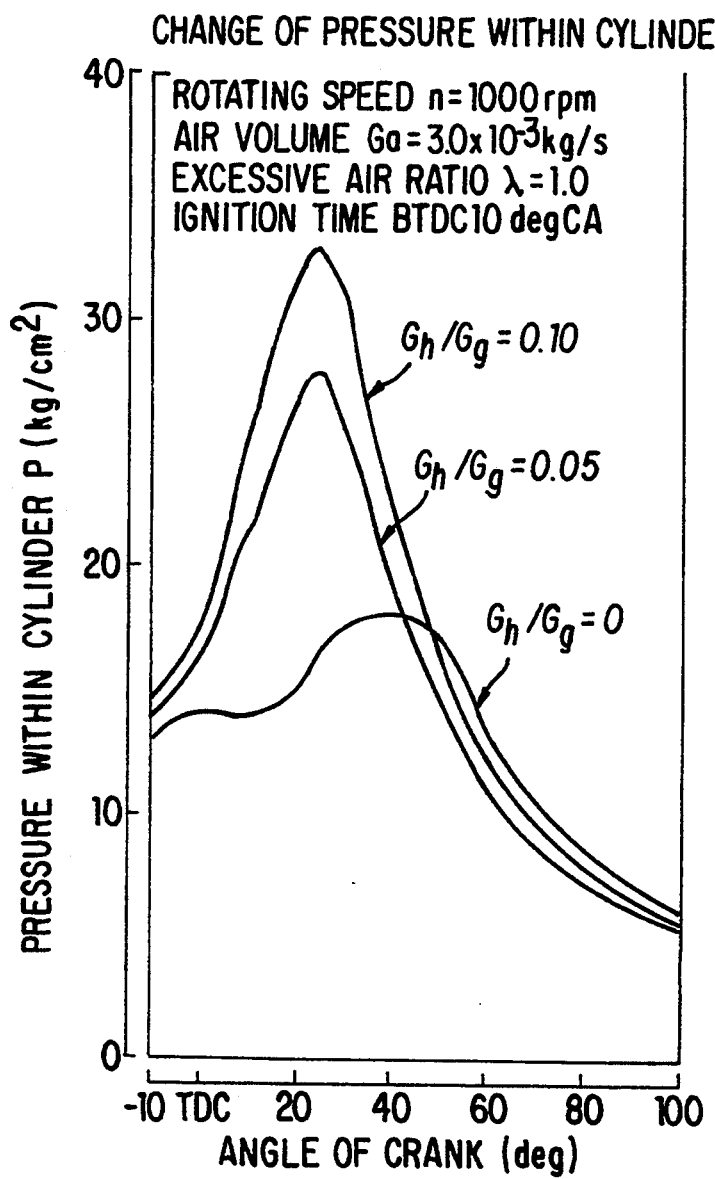

FIG. 39 is a manometric diagram showing the development of pressure within the cylinder when changing the value of Gh/Gg while keeping the air excessive ratio $\lambda$ and the ignition time constant. It is seen from FIG. 39 that, when increasing the ratio of flowing volume of hydrogen and gasoline (Gh/Gg), the time from ignition until reaching maximum pressure becomes short and the maximum pressure increases. On this occasion, as seen clearly in FIG. 3, a change in supplied calories Q/Q' is approximately 1.02 even at Gh/Gg=0.1, and it is considered that its effect hardly appears. Consequently, the difference by adding hydrogen as shown at FIG. 39 means mainly an increase in combustion speed.

Figure 40:
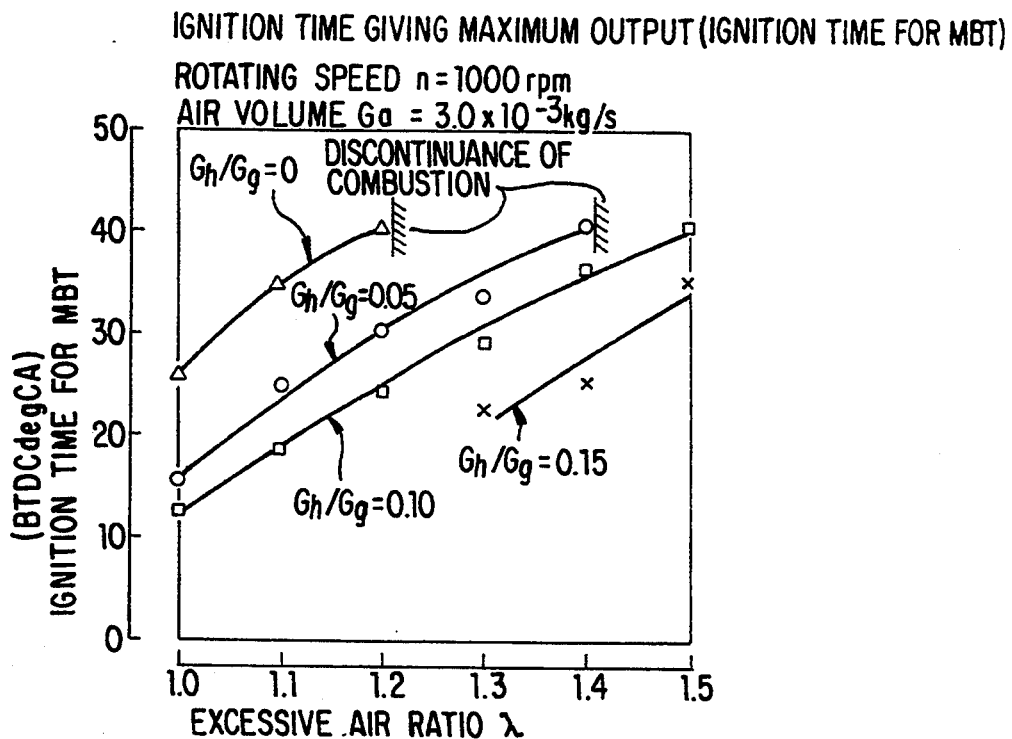

FIG. 40 shows the relationship between the excessive air ratio and Gh/Gg. with ignition time for MBT, and it is apparent from FIG. 39 that if Gh/Gg is increased at the same value of excessive air ratio, the ignition time for MBT is delayed (approaching TDC). This fact agrees with the result of the manometric diagram (FIG. 39) that it is conserved for combustion speed to increase, when increasing added volume of hydrogen. In addition, the expansion of discontinued combustion limit 6 based on adding hydrogen is clear from this figure.

Figure 41:
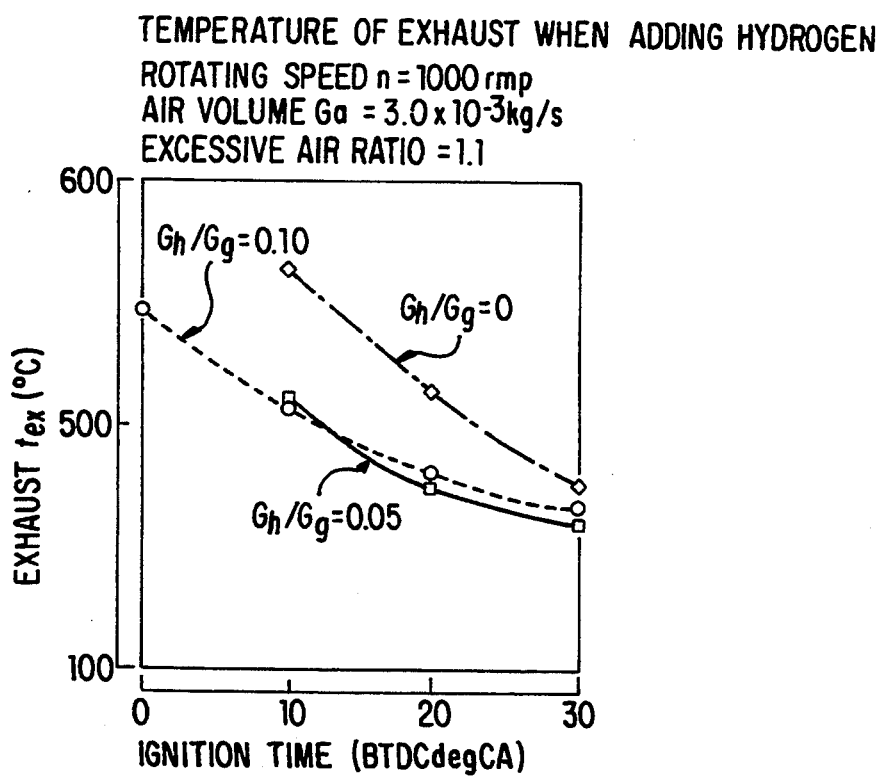
Figure 42:
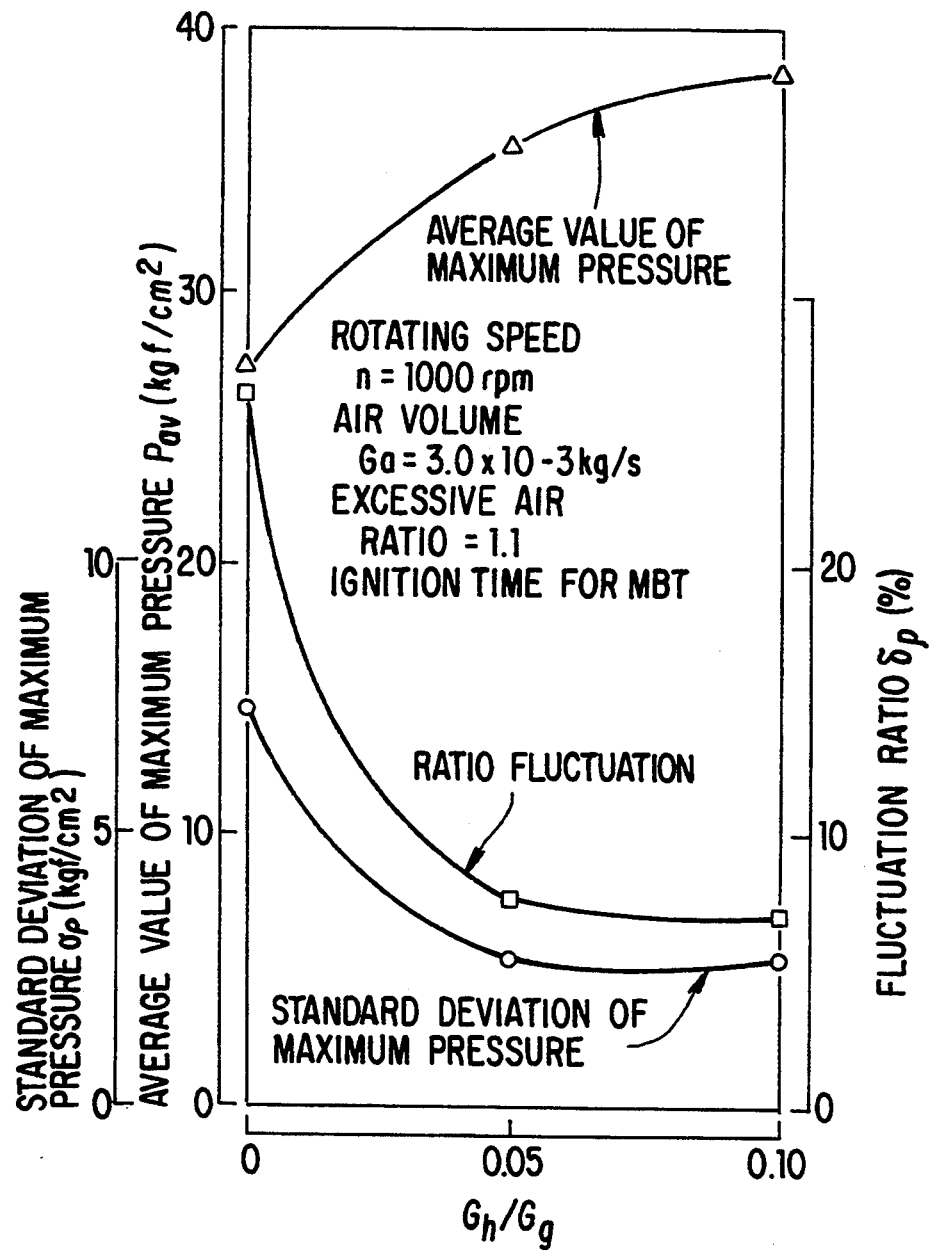
Figure 43:
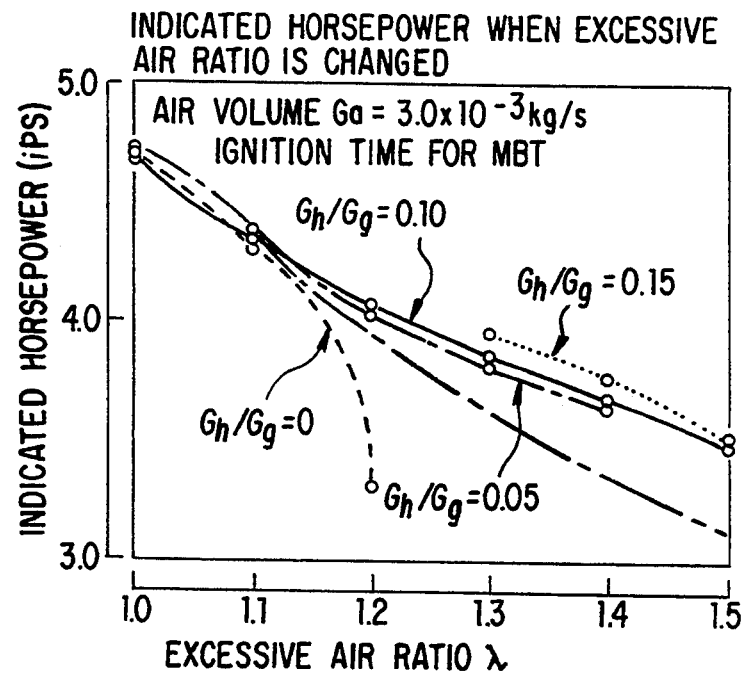

FIG. 41 shows the temperature of the exhaust measured approximately 150 mm below the exhaust valve using a thermoelectric couple. Since the exhaust valve is not kept perfectly warm, the absolute value is meaningless, but when compared relatively, a decrease of temperature is seen when adding hydrogen and corresponds to the tendency shown by FIG. 39. The standard deviation $\sigma_p$ and $\delta_p$ of maximum pressure within the cylinder when adding hydrogen is shown in FIG. 42. When the value of Gh/Gg is increased, both $\sigma_p$ and $\delta_p$ decrease, which means that the combustion within the cylinder has been stabilized. This phenomena is considered to be due to the large dispersion coefficient of hydrogen and to combustion characteristics as set forth previously. The indicated horse power at ignition time for MBT is shown in FIG. 43. When Gh/Gg=0, which means using gasoline only, combustion discontinuance occurs at an excessive air ratio of 1.2, and the indicated horsepower sharply f11s. When Gh/Gg=0.05, it was possible to drive until an excessive air ratio $\lambda$ of 1.4, but discontinuance of combustion occurred at an excessive air ratio of 1.5. When Gh/Gg=0.15, it was impossible to keep $G_a = 3.0 \times 10^{-3}$ kg/s due to the increase in the flowing volume of hydrogen. In FIG. 43, the indicated horsepower generally decreases with increase in the value of excessive air ratio, but if the supplied calories are inversely proportional to excessive air ratio $\lambda$ and the indicated thermal efficiency are fixed at one point FIG. 43, as shown by the chain line, and the decreasing ratio of the test result is less than this. An increase of the supplied calories by adding hydrogen is approximately 3% at Gh/Gg=0.15, and also in the case of hydrogen, a decrease in the mole number by combustion occurs, which is a contrary effect. Therefore, these influences are regarded as small. At the point obtained by experiment, there is almost no difference in Gh/Gg between 0.05 and 0.15. Consequently the reason why the experimental point comes above chain line at one point is considered to be an enhancement of the indicated heat efficiency.

Figure 44:
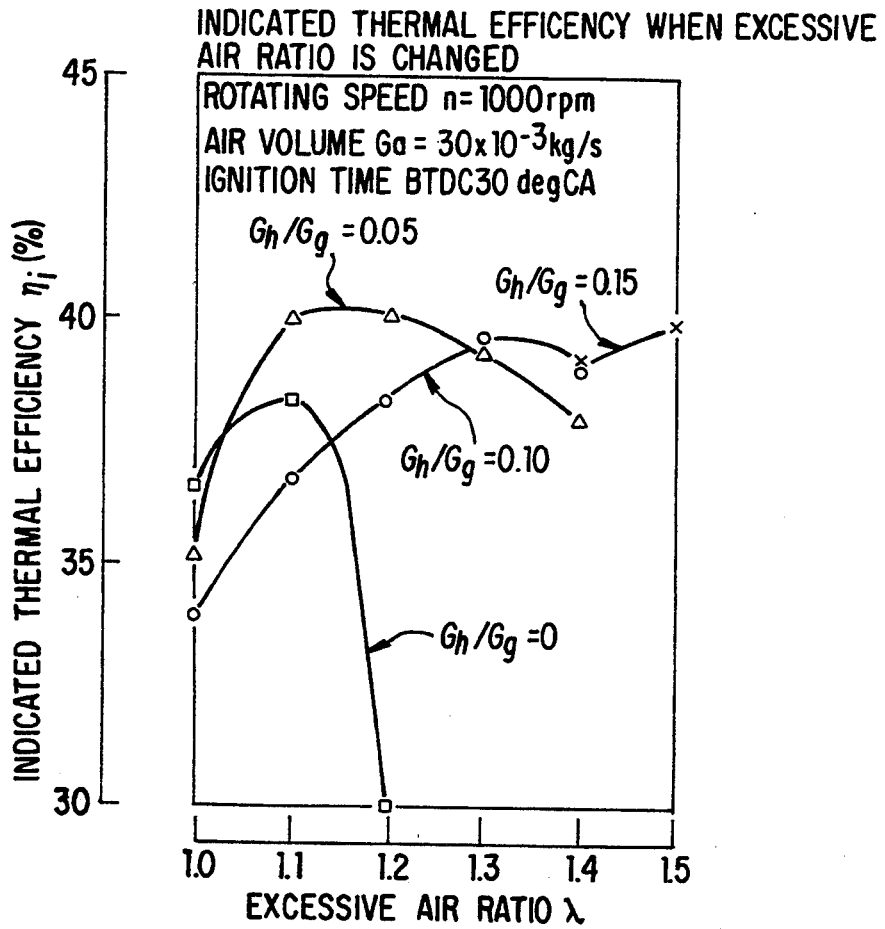

FIG. 44 shows the change in indicated heat efficiency $\eta_i$ when changing Gh/Gg and the excessive air ratio. It is impossible to compare this directly with the conditions of FIG. 43 because of the different adding time, but the enhancement of indicated heat efficiency with increases in excessive air ratio is definite, except for the range of decrease in indicated heat efficiency by imperfect combustion at the time when the combustion is about to discontinue. This is why it is considered that when approaching air cycle cyan increase in excessive air ratio, thermal loss decreases upon a fall of the combustion temperature. Moreover, the theoretical thermal efficiency $\eta_{th}$ of the auto-cycle of air only under the conditions of this experiment is approximately 47%.

Figure 45:
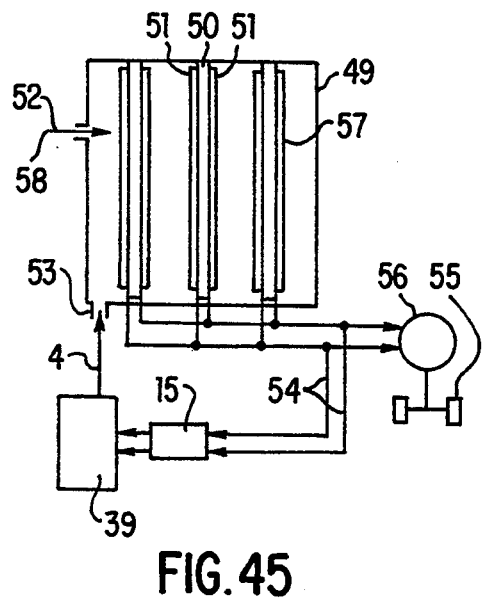
FIG. 45 shows a side view of example 18.

FIG. 45 illustrates an example of applying the system of the invention to an electric automobile.

Film 50 has holes and is sandwiched between two plastic film plates 51, and film 50 is fixed in box 49. The platinum plates serve as electrodes, and the air at room temperature freely enters through the hole 52. When hydrogen from the hydrogen generating apparatus 39 is supplied from hole 53 and exposed to gas mixed with oxygen within the air, one electrode produced a voltage of 1 V. If N volts are required, N electrodes are mounted in the box. Since a thin electrode, like a micro chip, has high energy efficiency, it is possible for an electrode weighing 1 kg. to produce electric power of 1 kw. Part of the electric power serves as a supply source of power supply circuit 15 for the energy system of the invention via 54, and most of the electric power is supplied to the motor 56 for driving the wheels 55 of automobile. An apparatus incorporating this film fuel battery and hydrogen generating apparatus into one unit is also contemplated by the invention.

Figure 46:
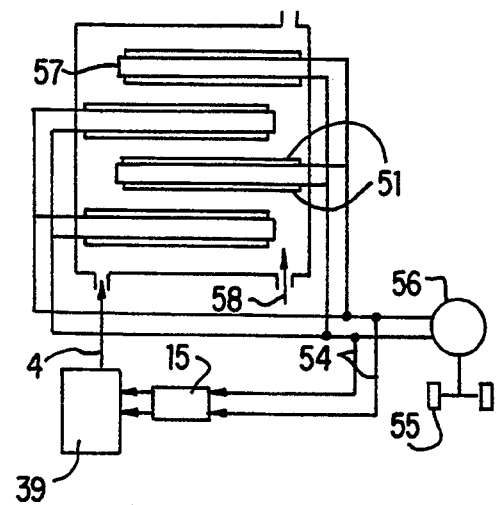
FIG. 46 shows a side view of example 19.

FIG. 45 shows an example of the invention wherein fuel batteries are placed sideways (horizontally). FIG. 46 shows an example of the invention wherein fuel batteries 57 are placed longitudinally and hydrogen 4 and air 58 are fully used when rising to contact the electrodes 51.

Figure 47:
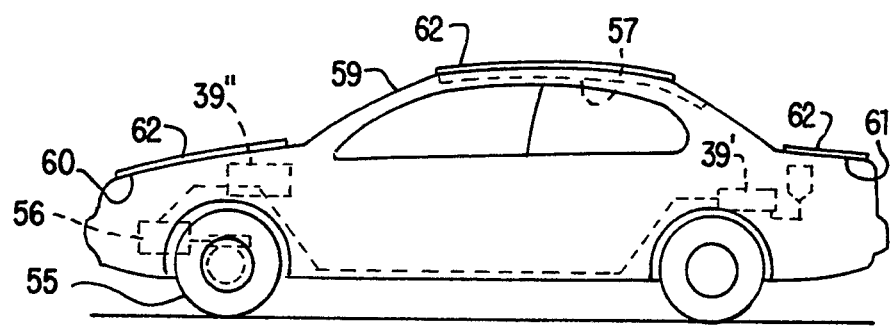
FIG. 47 shows a side view of example 20.

FIG. 47 shows an example of the invention comprising an electric automobile wherein solar batteries are attached to the outside of the roof 59 and the upper side of hood 60 and trunk lid 61. The hydrogen generating apparatus 39 is fixed at the rear portion 39' or front portion 39" within the car, and the film batteries 57 are attached to the inside of roof 59. Electric power is obtained by supplying to the film fuel battery 57 hydrogen produced by the hydrogen apparatus 39 and by electric power generated from the solar batteries operating by sun light, together with air. The electric power together with part of electric power from solar battery 62 is supplied to the motor 56 driving the wheels 55.

The outlet pipe 20 of the system is fixed within the suction pipe of a ready-made gasoline engine to cause the following effects:

1-(1) The limit of discontinuance of combustion, with thin fuel density is increased. The invention has the effect that the equivalent ratio of the limit in driving with thin fuel can more effectively be reduced as the load decreases.

1-(2) The invention has the noticeable effect that it is possible to adequately increase combustion speed of the engine and accelerate the speed of combustion of thin mixed gas on turbulent flow under the condition that the mixed gas is thin and mixing rate is small.

1-(3) In accordance with the invention, the maximum pressure within the cylinder rises, the ignition time for MBT is delayed, the exhaust temperature falls, the drop of indicated horsepower is less when increasing the air excessive ratio, and the indicated heat efficiency is enhanced.

1-(4) The invention has the effect that, when less than an equivalent rate of 1, the NO exhaust ratio at the lag angle of ignition decreases in comparison with the case when using gasoline only, even at same equivalent rate. The NO exhaust decreases at an ignition time for MBT of 1.0 to 1.1.

1-(5) The invention has the effect that it is possible to lower the HC exhaust ratio at a rarefied area. Because of its expanded limit in discontinuance of combustion, the HC exhaust can control a sharp increase on the rarefied side of fuel. The C0 exhaust is the same as the HC exhaust. As a result of driving at an air excessive ratio equal to or exceeding 1.0, the absolute value becomes low. The HC exhaust can prevent sharp increases of HC exhaust around the discontinuance of combustion with the value of excessive air ratio.

1-(6) CO exhaust does not increase sharply around the same discontinuance of combustion as the HC exhaust. As a result of driving at an excessive air ratio equal to or exceeding 1.0, the absolute value of the CO exhaust ratio is extremely low.

1-(7) There is the effect that the cycle fluctuation ratio decreases in accordance with the invention and it decreases to approximately half at a 10% mixing ratio, resulting in an increase of the maximum pressure and a delay of MBT ignition time.

1-(8) The rising ratio of pressure within the cylinder increases by adding hydrogen and the maximum pressure increases. In addition, the MBT ignition time is delayed.

1-(9) The exhaust temperature decreases when hydrogen is added.

1-(10) It is possible to expand the limitation in discontinuance of combustion in a large range of excessive air ratios by adding hydrogen. If the excessive air ratio is increased, the indicated heat efficiency is enhanced.

1-(11) In order to decrease composition of air pollution exhausted from an automobile engine, a rarefied combustion method has been tried, but an engine for using this method is complicated in comparison with a conventional engine. The invention is an epoch making one which can realize low environmental pollution without changing the construction of conventional automobiles and engines.

1-(12) Hydrogen has a wide combustion range, high combustible speed, lower ignition energy and is adaptable to more easily making uniform mixed gas, as compared with gasoline. Therefore, the invention is an epoch making one which can realize the combustion of thin mixed gas and decreases in exhausting nitric oxide by making use of these properties.

1-(13) Since the system of the invention adequately controls the volume of hydrogen according to the size of load, thinness of mixed gas, size of mixing ratio and ignition time for MBT, it has the maximum effect on non environmental pollution and fuel saving.

1-(14) The system of the invention, when assembling a controller, hydrogen generating apparatus and hydrogen tank, can make a hydrogen generating apparatus that is smaller and lighter than usual.

1-(15) Even when using mixed gas close to limit of driving with thinned gas, safe driving similar to those when using normal distributed gas, can be obtained with the invention.

1-(16) In addition to the effects when applying the invention to conventional gasoline engine as set forth above, the invention can eliminate air pollution, especially in the use of current diesel engine trucks, particularly with respect to exhaust gas discharged when driving at low speeds within a city, without changing the construction of the diesel engine truck.

In addition to the advantages of the invention set forth above, the effect of the invention is:

1. It is possible to make an automobile driven by hydrogen only, instead of mixing the hydrogen with gasoline, i.e. an automobile driven by water.
2. In accordance with the invention it is possible to drive a motor bicycle, vessel, jet airplane, rocket (solar battery is used for power source and water is obtainable from space) and also to an operate electric power generator, aluminum refinement, furnace, iron manufacture, burner, etc. by using water.
4. Since energy that has a clean exhaust can be obtained, such problems as the exhaust gas of automobile and exhaust materials from atomic power generation do not occur.
5. A particular liquid such as an electrolytic liquid is not required and regular water is usable. Therefore, water is obtainable from water taps and there is no need of going to a gas station.
6. The energy converting ratio is as high as 95%
7. Since the system is small and light and it is also operated by battery and portable, it can be placed in small space such as under the hood of an automobile, and is usable for conveyances such as automobiles.
8. Oxygen obtained together with the hydrogen can not only improve the cabin environment of automobile, etc. but can also prevent traffic accident by preventing the sleeping of the driver and by improving the driver's attentiveness.
9. The invention quickly takes away produced foam of hydrogen from film 8 when driving the car or engine, and also by placing the water tank 6 at a high position, and the method of connecting pipe 9 so that pressure of water on electrolytic film is increased. Therefore, permeation of water 1 into electrolytic film 11 is accelerated and the electrolytic effect is larger than publicly known.
10. Since the invention can heat water with the semi-conductors used for the power source and at the same time cool semi-conductors, it is superior in efficiency and reduces the size of the apparatus.
11. A rise in water temperature does not flow backward to the side of water tank but is concentrated on the side of electrolytic film only. Consequently, the water temperature can rise effectively with less energy.
12. It is possible for the operating voltage to be controlled to be 10% lower by increasing the water temperature.
13. Electric cars, etc. superior in efficiency can be made by the system of the invention, in combination with the film battery set forth above.

The invention has an ideal effect as a new energy source and is a revolutionary one, providing the same influence as the industrial revolution caused by James Watt's steam locomotive.

In addition to the above, the invention may be employed with a methanol car, a solar cell car, and electric car, a CNG car, a hydrogen car, a gas turbine car, a Sterling cycle engine, a hydro car (electric+diesel), and a carjointly using LPG, etc. Variations other than mentioned above are contemplated and considered to be within the scope of the invention.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. A system for generating hydrogen and oxygen comprising a tank having a bottom portion, a solid polyelectrolyte film in said tank separating said tank into first and second portions with opposed first and second sides facing said first and second portions, respectively, electrodes on said first and second opposite sides of said film, a power supply means connecting said power supply to said electrodes, means for introducing water into said bottom portion of said first portion of said tank, wherein said tank does not have an electrolytic liquid therein and said water is separated into hydrogen and oxygen by polyelectrolyte water electrolysis, vibrating means to vibrate said polyelectrolyte film, electrodes, and water in said tank, a power regulator for regulating power from said power supply, said power regulator including an electronic element that generates heat, and means for mounting said electronic element in said bottom portion of said tank for heating said water by heat generated thereby.

2. The energy system of claim 1 wherein said power regulator comprises means for supplying a constant current to said polyelectrolyte electrolytic film.

* * * * *